(12) United States Patent
Li et al.

(10) Patent No.: US 10,473,182 B2
(45) Date of Patent: *Nov. 12, 2019

(54) TORSIONAL VIBRATION ABSORPTION SYSTEM

(71) Applicant: GM GLOBAL TECHNOLOGY OPERATIONS LLC, Detroit, MI (US)

(72) Inventors: Dongxu Li, Troy, MI (US); Leonid Basin, Farmington Hills, MI (US); Shushan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,271

(22) Filed: Apr. 27, 2018

(65) Prior Publication Data

US 2018/0245662 A1     Aug. 30, 2018

Related U.S. Application Data

(63) Continuation of application No. 15/194,598, filed on Jun. 28, 2016, now Pat. No. 9,995,366.

(60) Provisional application No. 62/205,086, filed on Aug. 14, 2015.

(51) Int. Cl.
*F16F 15/123* (2006.01)
*F16D 3/12* (2006.01)
*F16H 45/02* (2006.01)
*F02D 41/00* (2006.01)

(52) U.S. Cl.
CPC .......... *F16F 15/12306* (2013.01); *F16D 3/12* (2013.01); *F02D 41/0087* (2013.01); *F16F 2230/0064* (2013.01); *F16H 45/02* (2013.01); *F16H 2045/0221* (2013.01); *F16H 2045/0294* (2013.01)

(58) Field of Classification Search
CPC .................. F16F 15/12306; F16F 15/1234
See application file for complete search history.

(56) References Cited

U.S. PATENT DOCUMENTS

| 4,113,075 | A  | 9/1978 | Walker |
| 4,252,227 | A  | 2/1981 | Staub, Jr. |
| 6,099,435 | A  | 8/2000 | Halene et al. |
| 8,479,901 | B2 | 7/2013 | Engelmann et al. |
| 8,807,310 | B2 | 8/2014 | Takikawa et al. |

(Continued)

FOREIGN PATENT DOCUMENTS

| WO | 2014096735 A1 | 6/2014 |
| WO | 2014161539 A1 | 10/2014 |

*Primary Examiner* — Timothy Hannon
(74) *Attorney, Agent, or Firm* — Quinn IP Law

(57) ABSTRACT

A system for absorbing vibration and transmitting torque from a rotating power source to a rotatable load includes a rotatable driving member configured as an input to be driven by the power source to rotate about an axis of rotation. The system has a cam plate with a cam surface. A spring is configured to extend lengthwise in a radial direction relative to the axis of rotation. The spring is configured to be compressed due to the cam surface during relative rotation of the driving member and a driven member when the cam plate is operatively connected to rotate in unison with said one of the driving member and the driven member. The spring therefore has an effective spring rate dependent upon the cam surface, compression of the spring absorbs torsional vibration of the driving member, and the cam plate.

18 Claims, 10 Drawing Sheets

(56) References Cited

U.S. PATENT DOCUMENTS

| | | |
|---|---|---|
| 2009/0221376 A1 | 9/2009 | Movlazada |
| 2014/0102398 A1 | 4/2014 | Orlamunder et al. |
| 2014/0222315 A1 | 8/2014 | Kwapis et al. |
| 2015/0107950 A1 | 4/2015 | Mauti |
| 2015/0316123 A1 | 11/2015 | Dogel et al. |

TORSIONAL VIBRATION ABSORPTION SYSTEM

CLAIM OF PRIORITY AND CROSS-REFERENCE TO RELATED APPLICATION

This application is a continuation of U.S. patent application Ser. No. 15/194,598, which was filed on Jun. 28, 2016, is now allowed, and claims the benefit of and priority to U.S. Provisional Application No. 62/205,086, filed Aug. 14, 2015, both of which are incorporated herein by reference in their respective entireties and for all purposes.

INTRODUCTION

The present teachings generally include a system for absorbing vibration while transmitting torque, such as a torque converter assembly.

A torque converter is a hydrodynamic unit that transfers torque between an engine and a transmission, and enables decoupling of the engine and transmission. The torque converter generally includes a torque converter pump portion (driving member), a turbine portion (driven member), and a stator portion that are disposed in a housing full of hydraulic fluid. The torque converter pump portion turns with a crankshaft of an engine. The turbine portion is typically connected to a transmission input shaft. A fluid coupling of the turbine portion and the pump portion can be achieved to transfer torque through the torque converter. At relatively low ratios of the speed of the turbine portion to the speed of the pump portion, redirection of hydraulic fluid within the torque converter causes torque multiplication. A torque converter clutch can be applied to provide a mechanical torque transfer path through the torque converter, bypassing the fluid coupling. Generally, it may be desirable to apply the torque converter clutch at the lowest engine speed possible to increase efficiency.

SUMMARY

A system for absorbing vibration and transmitting torque from a rotating power source to a rotatable load includes a cam plate having a cam surface and configured to be rotatable about an axis of rotation with one of the power source and the load. The system includes a spring configured to extend lengthwise at least partially in a radial direction relative to the axis of rotation and rotatable with the other of the power source and the load. The spring is configured to be compressed due to the cam surface during relative rotation of the power source and the load, the spring therefore having an effective spring rate dependent upon the cam surface. Compression of the spring absorbs torsional vibration of the power source. Stated differently, the spring is compressed in correspondence with or in relation to the cam surface. The amount of compression of the spring is dependent upon the cam surface.

In an embodiment for a torque converter assembly having a pump portion and a turbine portion operatively connected by a fluid coupling to transmit torque, the cam plate and the spring can provide a mechanical torque path to transmit torque from the power source to the load, bypassing the fluid coupling. For example, a torque converter clutch can selectively operatively connect the cam plate for rotation with the power source to establish the mechanical torque path.

The system may be for a powertrain in an automotive vehicle, or a non-automotive vehicle, such as a farm vehicle, a marine vehicle, an aviation vehicle, etc. It is to also appreciated that the system can be included in appliances, construction equipment, lawn equipment, etc., instead of vehicles.

The system with the novel cam plate and spring design may offer further torsional vibration isolation ability and may lower the engine speed at which torque converter clutch lockup can be commanded in automotive torque converter applications. Moreover, because the effective spring rate is fully flexible by selecting the cam surface and the actual spring rate, responsiveness can be improved in comparison to systems that rely on long travel spring dampers, such as those arranged in an arc about the axis of rotation. Additionally, the system may have a reduced cost and mass in comparison to other torsional vibration absorber systems.

The above features and advantages, and other features and advantages of the present teachings, are readily apparent from the following detailed description of the representative embodiments and modes for carrying out the present teachings when taken in connection with the accompanying drawings. The above summary is not intended to represent every embodiment or every aspect of the present disclosure. Rather, the foregoing summary merely provides an exemplification of some of the novel aspects and features set forth herein.

Figure 1:
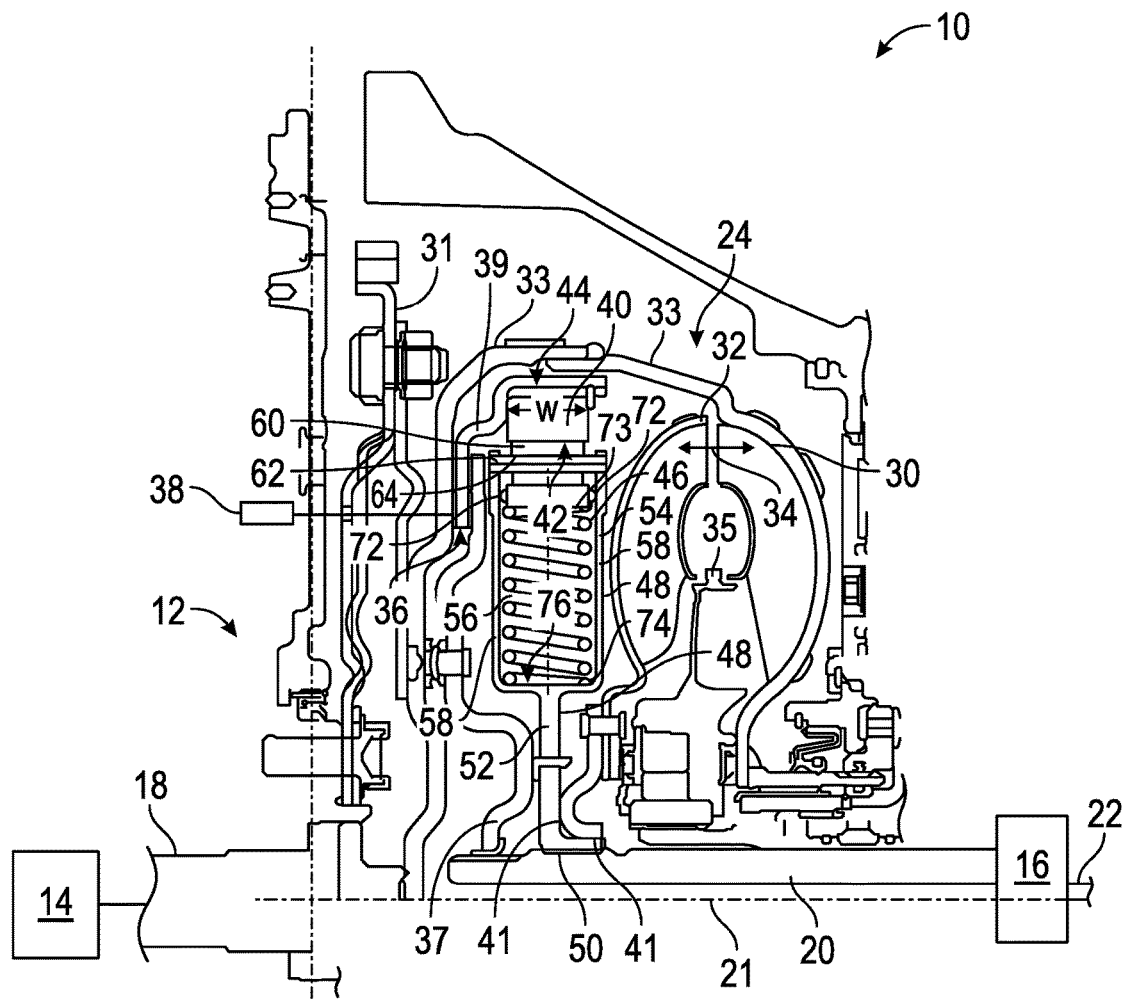
FIG. 1 is a schematic cross-sectional view of a powertrain with a torque converter assembly for absorbing vibration and transmitting torque.

The present disclosure is susceptible to various modifications and alternative forms; some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

Figure 4:
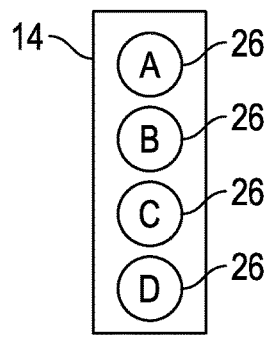
FIG. 4 is a schematic illustration of a four cylinder in-line engine in a four cylinder mode.
Figure 6:
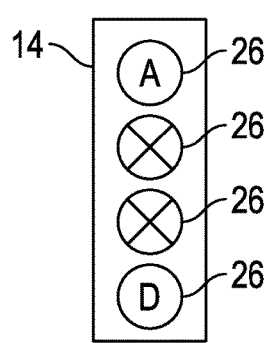
FIG. 6 is a schematic illustration of the engine of FIG. 4 in a two cylinder mode.

Referring to the drawings, wherein like reference numbers refer to like components throughout the views, FIG. 1 shows a portion of a vehicle 10 having a powertrain 12. The powertrain 12 is operable to provide motive power to propel the vehicle 10. The powertrain 12 includes a power source 14, such as an engine. The engine 14 may be any type of engine, such as a spark ignition engine, a compression ignition engine, or otherwise. Moreover, the engine 14 may be any layout or configuration, and may have any number of cylinders. In FIGS. 4 and 6, for purposes of example only, the engine 14 is depicted as an inline, four cylinder engine with selectively deactivatable cylinders 26 allowing the engine 14 to be operated in either a four cylinder mode or a two cylinder mode.

The powertrain 12 also includes a load driven by the power source 14. The load is represented by a transmission 16. In other words, rotational torque at an engine output member 18, such as a crankshaft, is transferred to a transmission input member 20. The transmission 16 is operable to vary the speed ratio between the transmission input member 20 and a transmission output member 22 that provides driving torque to vehicle wheels (not shown). The transmission 16 may be an automatic transmission, a manual transmission, an automated manual transmission, and may have any layout or configuration.

The powertrain 12 includes a system 24 for absorbing vibration and transmitting torque from a rotating power source, such as the engine crankshaft 18, to a rotatable load, as represented by the transmission input member 20. Only a portion of the system 24 above the axis or rotation 21 is shown in FIG. 1. The portion below the axis of rotation 21 is substantially a mirror image of the portion shown. In the application shown, the system 24 is referred to as a torque converter assembly 24 and is shown in an automotive vehicle application. The system may be used in non-automotive and/or non-vehicle applications to absorb vibration and transmit torque between a rotating power source and a rotating load as discussed herein. The torque converter assembly 24 may be for a powertrain in an automotive vehicle, or a non-automotive vehicle, such as a farm vehicle, a marine vehicle, an aviation vehicle, etc. It is also appreciated that the system can be included in appliances, construction equipment, lawn equipment, etc., instead of vehicles.

Figure 5:
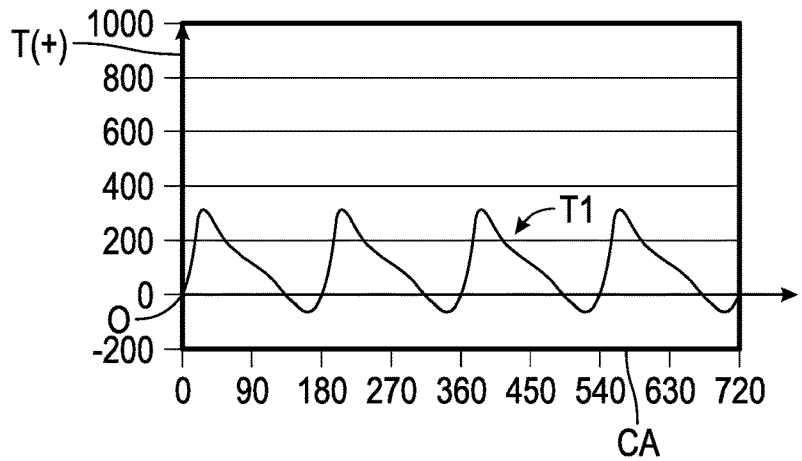
FIG. 5 is a plot of torque at the engine output shaft of FIG. 2 versus engine crank angle for the engine in the four cylinder mode of FIG. 4.

Torque generated by a rotating power source may exhibit torsional vibration, such as a harmonically varying rotational speed, the magnitude of which may vary depending upon the rotational speed. As is understood by those skilled in the art, an engine 14 relying on combustion to generate torque exhibits torsional vibration at the crankshaft 18 due to the spaced firing order in the engine cylinders. For example, FIG. 4 depicts the engine 14 with four cylinders 26 labelled A, B, C and D, each of which is fired in a selected firing sequence in a four cylinder mode of operation of the engine 14. FIG. 5 illustrates an example plot of periodic torque T, in Newton-meters (Nm), at the engine crankshaft 18 on the vertical axis versus crank angle rotation (CA) on the horizontal axis, from 0 to 720 degrees rotation of a four stroke cycle of the engine 14. In other words, the magnitude of the engine torque T1 varies with the crank angle (angle of rotation). Four peaks in torque T1 shown in the plot of FIG. 5 are associated with the combustion cycle of the four cylinders 26.

Figure 7:
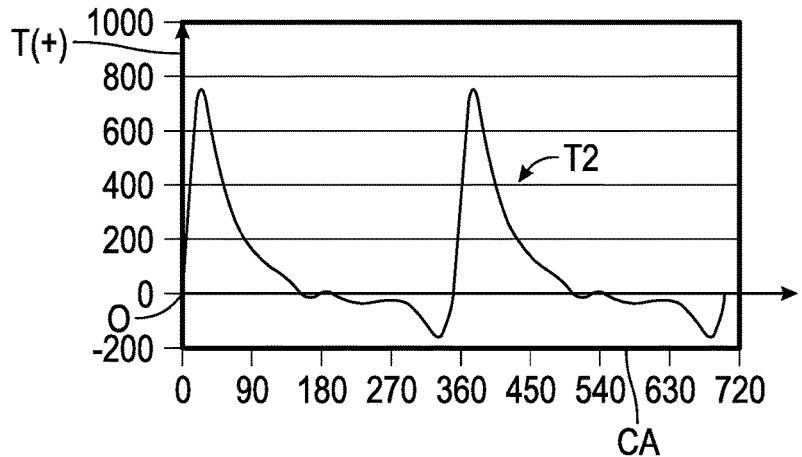
FIG. 7 is a plot of torque at the engine output shaft of FIG. 2 versus engine crank angle for the engine in the two cylinder mode of FIG. 6.

Some modern engines are operable in different operating modes in which the number of cylinders activated, the valve lift, and/or the valve timing may be varied depending on vehicle operating conditions, such as to increase fuel efficiency. If an engine is operable in more than one mode, a different periodic torque may result at the crankshaft 18. For example, the engine 14 is shown in FIG. 6 operated in a two cylinder mode, with only cylinders A and D firing in a timed order, and with cylinders B and C deactivated (i.e., not fueled or fired). An example resulting plot of periodic torque T2 at the engine crankshaft 18 on the vertical axis versus crank angle rotation (CA) from 0 to 720 degrees of rotation over a four stroke cycle of the engine 14 is shown in FIG. 7. The periodic torque T2 is different in magnitude and period from the periodic torque T1 during the four-cylinder mode. Only two peaks in periodic torque T2 result from the combustion cycle in each of the two active cylinders A, D.

Figure 8:
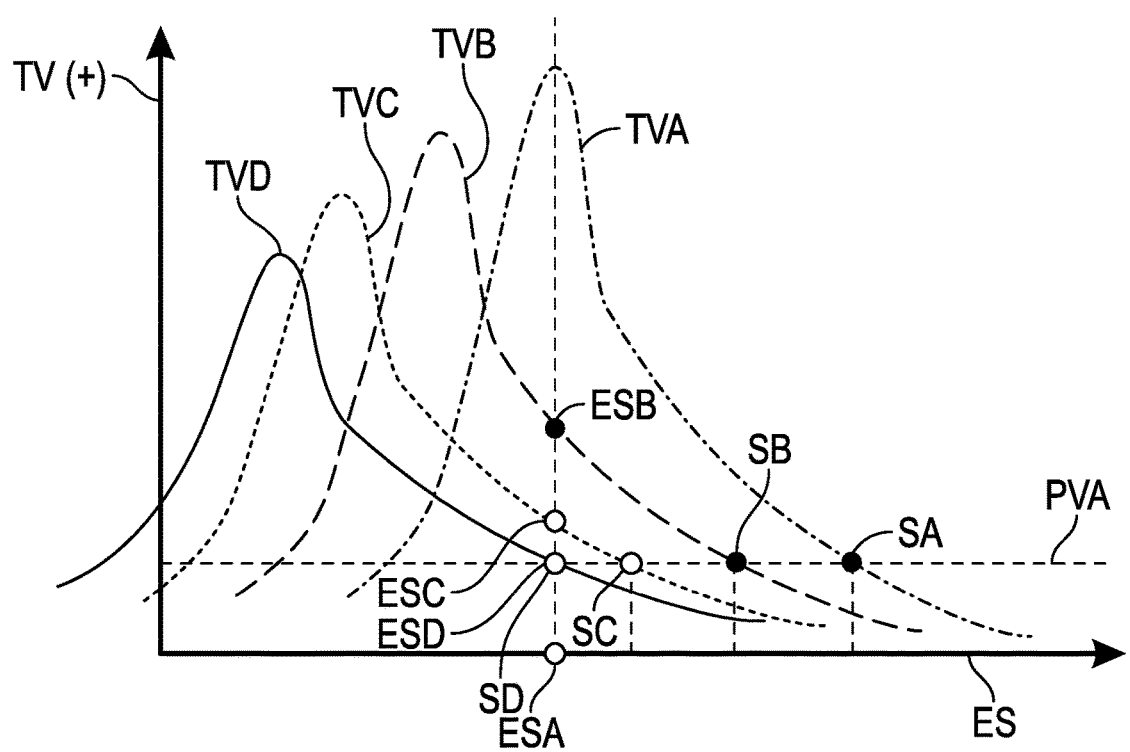
FIG. 8 shows plots of amplitude of torsional vibration in decibels (dB) of a transmission output member of the powertrain of FIG. 1 versus engine speed in revolutions per minute (rpm) for various engine types.

FIG. 8 shows plots of amplitude of torsional vibration (TV) in decibels (dB) of a transmission output member versus engine speed (ES) in revolutions per minute (rpm) for various conventional powertrains including a powertrain with a two cylinder engine (plot TVA), a three cylinder engine (plot TVB), a four cylinder engine (plot TVC), and a six cylinder engine (plot TVD). FIG. 8 illustrates that conventional powertrains having different numbers of fired cylinders reach a predetermined amplitude of torsional vibration PVA at different engine speeds. The predetermined amplitude of torsional vibration PVA is an amplitude determined to be acceptable for the application. For example, in a vehicle application, the amplitude of torsional vibration PVA is such that predetermined noise, vibration, and harshness (NVH) requirements are satisfied. Generally, engines with fewer numbers of fired cylinders reach the predetermined amplitude of torsional vibration PVA at higher engine speeds. As shown, the engine speeds SA, SB, SC, SD at which torsional vibration decreases to the acceptable level PVA decreases as the number of fired cylinders increases. For a given engine speed ESA at which the amplitude of torsional vibration TVA of the two cylinder engine is at a peak, the amplitudes of torsional vibration TVB, TVC, and TVD of the three, four, and six cylinder engines are at lower levels ESB, ESC, and ESD.

Figure 2:
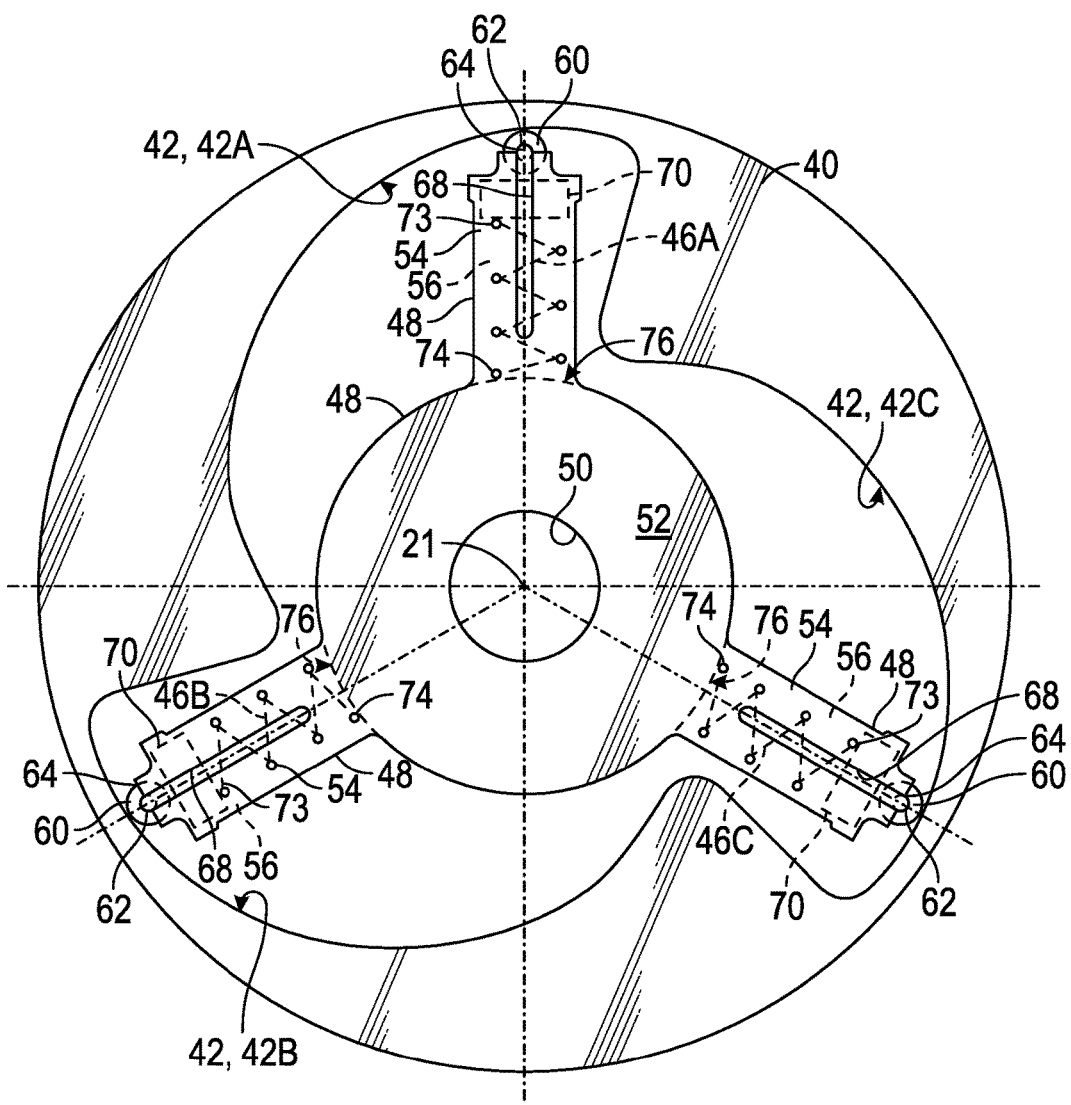
FIG. 2 is a schematic side view illustration of a portion of the torque converter assembly.
Figure 3:
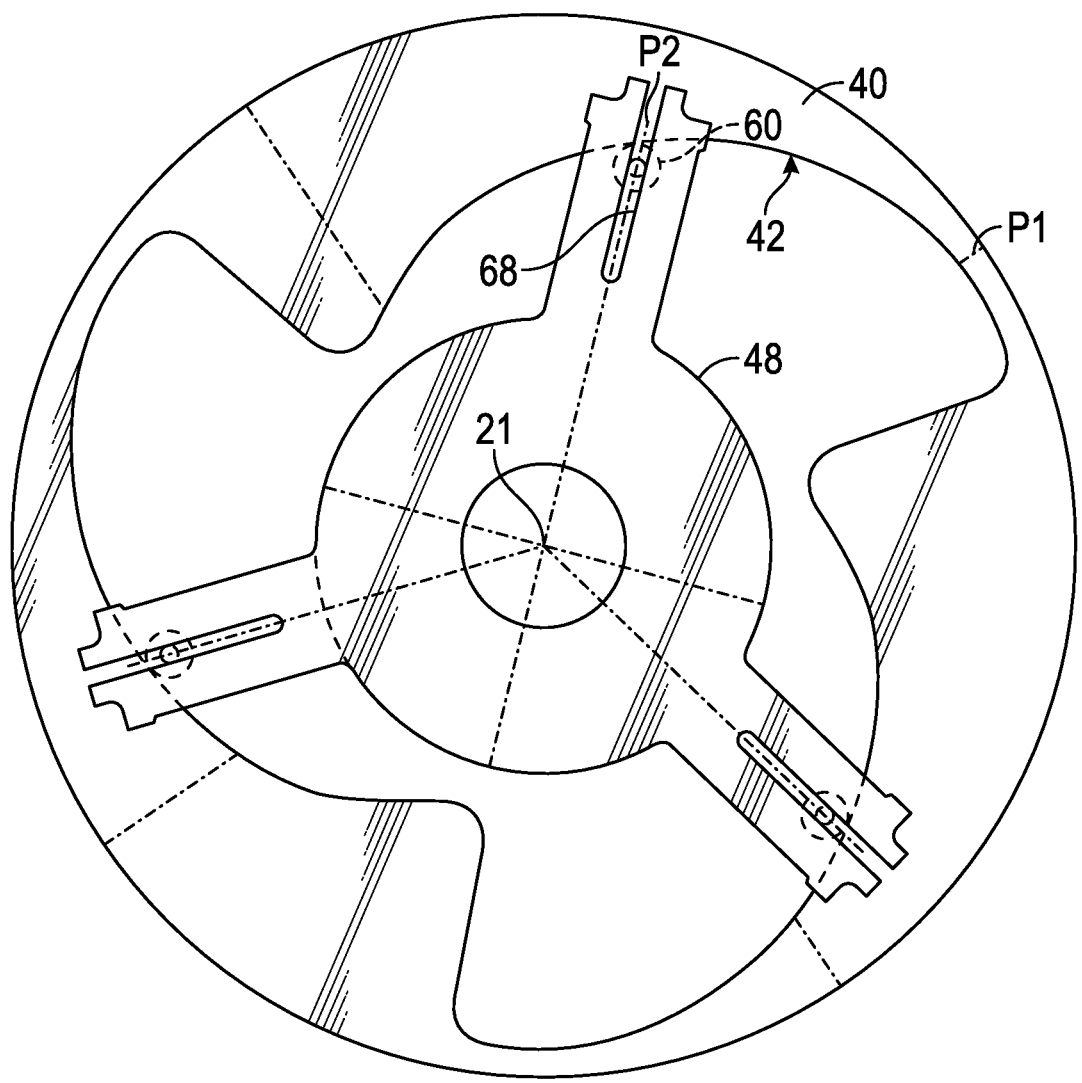
FIG. 3 is a schematic side view illustration of the portion of the torque converter assembly of FIG. 2 showing relative rotation.

With reference to FIGS. 1-3, an improved torque converter assembly 24 enhances vibration isolation by providing an arrangement that enables a fully flexible effective spring rate, as described herein, that can result in achieving a desirable, predetermined amplitude of torsional vibration PVA at a lower engine speed than with a conventional torque converter assembly. As used herein, a "fully flexible" effective spring rate means that a spring having only a single actual spring rate can be made to function for torsional vibration absorption equivalently to a spring having one or more different spring rates. The torque converter assembly 24 includes a rotatable driving member, also referred to herein as a pump portion 30 configured as an input to be driven by the power source (engine 14). The pump portion 30 may be driven by the engine 14 via a connection to the engine crankshaft 18 such as by a flywheel and flex plate connection 31 (shown in part) and one or more cover portions 33 that are secured to the pump portion 30 for rotation therewith. Stated differently, the pump portion 30 is operatively connected to the crankshaft 18 for rotation in unison therewith (i.e., together with and at the same speed as the crankshaft 18).

The torque converter assembly 24 further includes a rotatable driven member, referred to herein as a turbine portion 32 configured to be driven by the pump portion 30 via a fluid coupling 34 of the pump portion 30 to the turbine portion 32, represented by a double-sided arrow in FIG. 1. As is well understood by those skilled in the art, a torque converter can be configured to establish a fluid coupling of a pump portion to a turbine portion through fluid contained in the torque converter assembly 24. The torque converter assembly 24 also has a stator portion 35 configured to direct hydraulic fluid flow between the pump portion 30 and the turbine portion as is understood by those skilled in the art. The one or more cover portions 33 surround the components between the crankshaft 18 and the transmission input member 20.

Torque transfer via the fluid coupling 34 multiplies torque from the pump portion 30 to the turbine portion 32 at low speed ratios of the speed of the transmission input member 20 to the speed of the crankshaft 18. There is some slippage through the fluid coupling 34, which may decrease fuel economy at some speed ratios. Accordingly, a torque converter clutch 36 is placed in parallel with the fluid coupling 34 and is selectively engageable to establish torque transfer from the crankshaft 18 and operatively connected pump portion 30 through the torque converter assembly 24 to the transmission input member 20 along a mechanical path that bypasses the fluid coupling 34. The mechanical path includes a cam plate 40, a roller element 60, a block 70, springs 46, and a spring housing 48 discussed herein. Because the turbine portion 32 is also fixed to rotate with the spring housing 48, as shown at fixed portions 41, which may be, for example, press-fit or weld areas, engagement of the clutch 36 causes the pump portion 30 to rotate with the turbine portion 32.

More specifically, the torque converter clutch 36 engages by axial movement of an apply plate 37 (i.e., movement to the left in FIG. 1) to place a friction plate 39 into engagement with the cover portion 33 and therefore causes the friction plate 39 to rotate at the same speed as the crankshaft 18 and the pump portion 30. An electronic controller 38 is operatively connected to the torque converter clutch 36 and engages the clutch 36 under predetermined operating conditions of the powertrain 12. For example, the electronic controller 38 may control valves to fill and empty fluid cavities to apply pressure to move the apply plate 37 to engage or release the clutch 36. The predetermined operating conditions under which the controller 38 commands engagement of the torque converter clutch 36 are provided to the controller 38 from various sensors or other components (not shown) configured to determine operating conditions. The operating conditions may include, but are not limited to, torque or speed of the crankshaft 18, torque or speed of the transmission input member 20, a speed differential between the pump portion 30 and the turbine portion 32, vehicle speed, and a commanded engine operating mode.

The fluid coupling 34 of the pump portion 30 and the turbine portion 32 is useful for damping engine vibrations and multiplying torque at relatively low speed ratios of the speed of the transmission input member 20 to the speed of the crankshaft 18. However, at other speed ratios, slip of the fluid coupling 34 can decrease efficiency, and it is generally most efficient to engage the clutch 36 are as low an engine speed as possible while meeting a predetermined acceptable torsional vibration amplitude PVA, as discussed with respect to FIG. 8. Accordingly, the electronic controller 38 engages the torque converter clutch 36 to establish a mechanical torque transfer path that bypasses the fluid coupling 34.

To absorb torsional vibration of the engine output member 18 when the clutch 36 is engaged, the torque converter assembly 24 includes a cam plate 40 and radially-extending springs 46. In the embodiment shown in FIG. 2, the cam plate 40 is generally annular, and has three identical cam surfaces 42A, 42B, and 42C at an inner periphery of the cam plate 40. The cam surfaces 42A, 42B, 42C may be generally referred to with reference number 42 herein. The cam plate 40 has an outer surface 44 configured with splines at which the cam plate 40 is splined to the friction plate 39 as shown in FIG. 1. Accordingly, when the clutch 36 is engaged, the cam plate 40 is operatively connected to and rotates in unison with the pump portion 30.

The torque converter assembly 24 has a spring 46A configured to extend lengthwise in a radial direction relative to the axis of rotation 21. The spring 46A is shown as a coil spring. The spring 46A is configured to be compressed due to and in correspondence with (i.e., an amount in relation to) the first cam surface 42A during relative rotation of the cam plate 40 and the spring housing 48 when the cam plate 40 is operatively connected to rotate with the crankshaft 18 and the pump portion 30 by engagement of the clutch 36. In the embodiment shown in FIGS. 1 and 2, the torque converter assembly 24 includes three springs 46A, 46B, 46C which may be referred to generally with reference number 46 as they are substantially identical to one another, and each extend in a respective radial direction relative to the axis of rotation 21. The springs 46 are supported in a spring housing 48 and are angularly spaced about the axis of rotation 21 equidistant from one another. The cam surface 42A is a first cam surface and the spring 46A is a first spring. The cam surface 42B is a second cam surface spaced angularly about the axis of rotation 21 from the first cam surface 42A.

The spring 46B is a second spring spaced angularly about the axis of rotation 21 from the first spring 46A and configured to extend lengthwise in a radial direction relative to the axis of rotation 21. The second spring 46B is configured to be compressed due to and in correspondence with the second cam surface 42B during relative rotation of the cam plate 40 and the spring housing 48 when the cam plate 40 is operatively connected to rotate with the crankshaft 18 and the pump portion 30 by engagement of the clutch 36.

A third spring 46C is spaced angularly about the axis of rotation 21 from the first spring 46A and the second spring 46B and is configured to extend lengthwise in a radial direction relative to the axis of rotation 21. The third spring 46C is configured to be compressed due to and in correspondence with the third cam surface 42C during relative rotation of the cam plate 40 and the spring housing 48 when the cam plate 40 is operatively connected to rotate with the crankshaft 18 and the pump portion 30 by engagement of the clutch 36. The first, second, and third springs 46A, 46B, and 46C are substantially identical to one another in size, shape, and actual spring rate $K_r$ (i.e., the spring rate when compressed in a longitudinal direction of the spring which, in the embodiment shown, is a radial direction of the torque converter assembly 24), and the first, second, and third cam surfaces 42A, 42B, and 42C are substantially identical to one another such that the effective spring rate $K_{eff}$ of each of the first, second, and third springs is substantially identical. Although three springs 46 and three cam surfaces 42 are shown in the embodiment of FIG. 2, in other embodiments, only two springs 46 and two cam surfaces 42 can be used, or more than three springs and three cam surfaces can be used. The springs 46 will be placed angularly closer to or further from one another, and the cam surfaces 42 will extend over a smaller or larger angular extent of the cam plate 40 in relation to the number of springs 46 and cam surfaces 42 used. Additionally, although the springs 46 are shown as extending lengthwise entirely in a radial direction, in other embodiments, springs that extend only partially in the radial direction may be used. For example, springs arranged linearly but tilted relative to the radial direction may be used. Additionally, springs arranged generally in an arc about the axis of rotation, but having one end closer to the axis of rotation than the other end can be used, as such springs also extend at least partially in a radial direction and can be configured to interface with cam surfaces of a cam plate as discussed herein.

As further discussed herein, the springs 46 are housed in and rotatably carried by a spring housing 48. Referring to FIGS. 1 and 2, the spring housing 48 has a center opening 50 at which it is splined to the transmission input member 20. Accordingly, the springs 46 rotate in unison with (i.e., together with and at the same speed as) the spring housing 48 and the transmission input member 20 about the axis of rotation 21.

The spring housing 48 has a hub 52 and spring cages 54 supported on the hub 52 and extending radially outward therefrom. As best shown in FIG. 1, each spring cage 54 has a center cavity 56 bounded by two axially-spaced arms 58. In other words, the arms 58 are forked or bifurcated relative to the hub 52. The spring 46 is positioned in the center cavity 56. The arms 58 are spaced axially further from one another than a width W of the cam plate 40 shown in FIG. 1. This allows for relative rotation of the cam plate 40 and the spring housing 48 without interference of the arms 58 with the cam plate 40.

FIG. 1 shows a roller element 60 fit on a pin 62 which is secured to the spring housing 48 so that the roller element 60 can rotate about an axis of rotation 64 extending along a length of the pin 62. Additionally, ends of the pin 62 are confined to move along a radially-extending slot 68 provided in each of the arms 58, best shown in FIG. 2. Identical roller elements 60, pins 62, and slots 68 are provided at each spring cage 54. In embodiments with fewer or more than three springs 46, the spring housing 48 will be provided with an equal number of spring cages 54.

A block 70 is disposed between the roller element 60 and the spring 46. The block 70 may be disc-shaped or otherwise shaped. The block 70 may include bearings 72 or other rolling members that interface with the spring housing 48. As further discussed herein, this enables the block 70 to react a component of force $F_x$ of the cam surface 42 on the roller element 40 that is perpendicular to the radial direction and allows the block 70 to slide within the spring housing 48 in the radial direction as the spring 46 is compressed by the interface of the roller element 60 with the cam surface 42 during relative rotation of the cam plate 40 and the spring housing 48. The radially-extending springs 46 are limited in their ability to react forces perpendicular to a radial direction.

Each roller element 60 is therefore operatively connected to a radially outer end 73 of the respective spring 46 via the block 70, and is configured to roll along the cam surface 42 during relative rotation of the cam plate 40 and the spring housing 48 when the clutch 36 is engaged so that the cam plate 40 is operatively connected for rotation in unison with the crankshaft 18 and the pump portion 30. Each spring 46 has a radially inner end 74 configured to interface with a surface 76 of the spring housing 48 within the cavity 56. Each spring 46 is thus compressed in a radial direction relative to the axis of rotation 21 between the adjacent block 70 and the surface 76.

When torsional vibration occurs at the crankshaft 18, such as due to engine firing, if the clutch 36 is engaged, the vibration will be transferred to the cam plate 40. As shown in FIG. 3, the cam plate 40 is shown rotated clockwise relative to the position of FIG. 2 to indicate the torsional vibration. The roller elements 60 roll across the cam surface 42 a distance from the position P1 of FIG. 2 to position P2 in FIG. 3, and also move radially inward, sliding in the slots 68, as the cam surface 42 is closer to the axis of rotation 21 at P2 than at P1. The springs 46 are thus configured to be compressed due to and in correspondence with the cam surface 42 during relative rotation of the crankshaft 18 and the transmission input member 20 (i.e., rotation of the cam plate 40 and the pump portion 30 relative to the spring housing 48, the turbine portion 32, and the transmission input member 20) when the clutch 36 is engaged. In other words, under sufficient vibrational torque on the cam plate 40, the springs 46 will compress. The energy required to compress the springs 46 due to vibration (i.e., in excess of the spring compression caused by the steady torque required to drive the vehicle 10) is the same amount of energy it takes for the spring to absorb torsional vibration of the driving member (i.e., the crankshaft 18 via the pump portion 30) relative to the driven member (i.e., the transmission input member 20.

Figure 9:
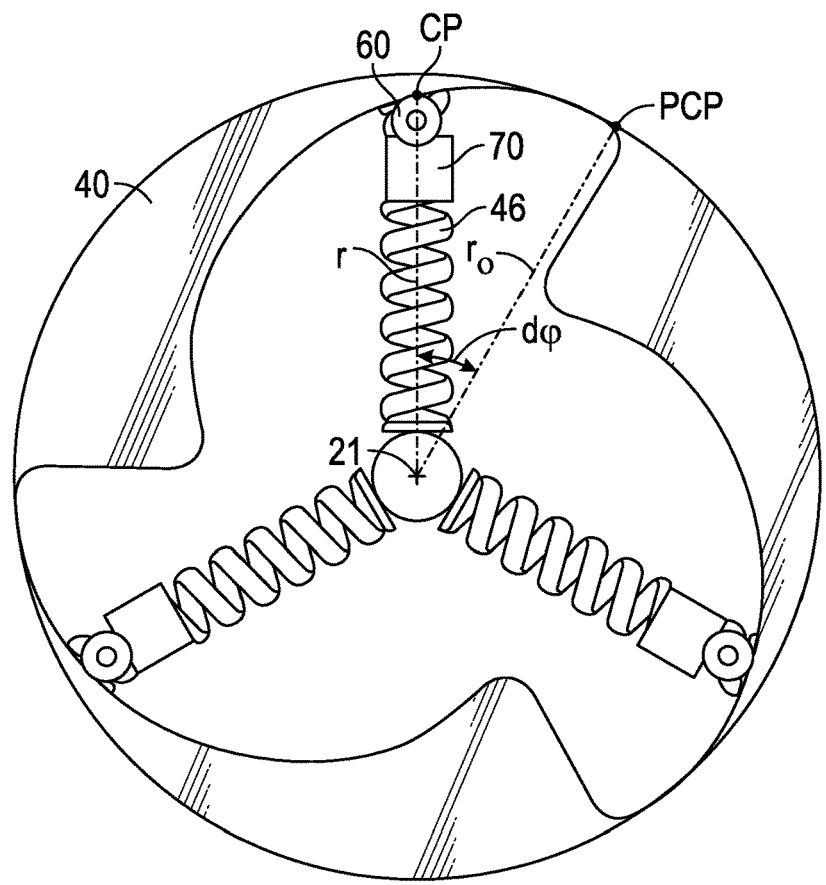
FIG. 9 is a schematic side view illustration of a portion of the torque converter assembly of FIG. 2 with a spring housing removed for clarity.
Figure 10:
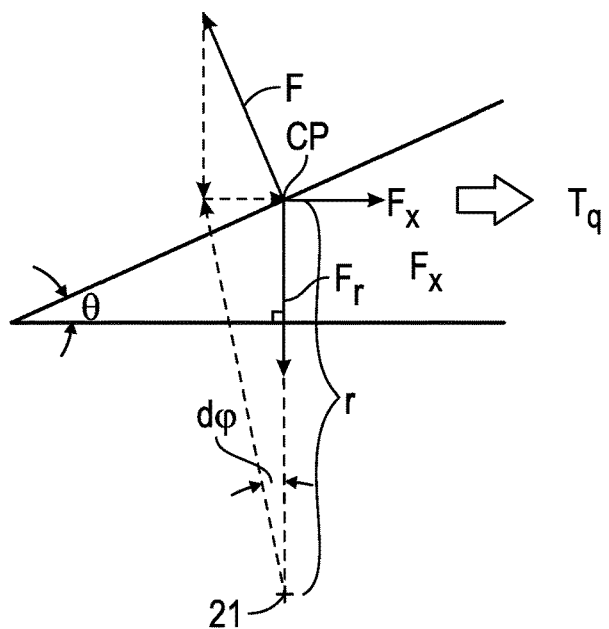
FIG. 10 is a schematic illustration of a force analysis associated with the torque converter assembly of FIG. 9.

With reference to FIGS. 9 and 10, the amount of force $F_r$ applied by the rotating cam plate 40 to compress the spring 46 and the amount $F_x$ applied perpendicular to the radius extending through the spring 46 (and therefore resulting in torque Tq transferred to the spring housing 48 and the transmission input member 20) is dependent upon the angle θ between a tangent to the cam surface 42 and a line perpendicular to the radial direction at a contact point CP of the roller element 60 (also referred to as the cam angle θ). The effective spring rate $K_{eff}$ is therefore controlled by the design of the cam surface 42 and the selection of the actual spring rate $K_r$ of the spring 46. Although radially-extending, the springs 46 therefore function as torsional springs due to the cam surfaces 42. In FIG. 9, the spring housing 48 is removed for clarity.

The force balance diagram shown in FIG. 10 indicates that the force F of the spring 46 (through the roller element 60) at the contact point CP against the cam plate 40 is balanced by a force component $F_x$ contributing to torque Tq (i.e., perpendicular to the axis of rotation 21) and the force component Fr acting in the radial direction and contributing to compression of the spring 46. More specifically, $$Tq = F_x r = K_r(r_o - r)\tan(\theta)r,$$

where Tq is torque, $F_x$ is the force component perpendicular to a radius r from the contact point CP to the axis of rotation 21, $r_o$ is the radius from a previous contact point PCP of the roller element 60 to the axis of rotation 21 when the cam plate 40 was at the previous position (which may be the install height of the spring 46) prior to the relative rotation of the cam plate 40 by an angle dψ.

The change in torque applied through the springs 46 to the transmission input member 20 is due to relative rotation (i.e., the torsional vibration) is therefore, $$dTq = \frac{dTq}{dr}dr + \frac{dTq}{d\theta}d\theta,$$

which is equivalent to $$\frac{dTq}{dr}\frac{dr}{d\varphi}d\varphi + \frac{dTq}{d\theta}\frac{d\theta}{d\varphi}d\varphi.$$

The effective spring rate $K_{\it{eff}}$ provided by the combination of the radially-extending spring 46 (that has an actual spring rate $K_r$ along the radius r) acting through the roller element 60 on the cam surface 42 is a function of the angle θ between a tangent to the cam surface 42 at the contact point of the roller element 60 to a line perpendicular to the radius, and of the angular position ψ of the cam surface 40 as follows:

$$K_{\it{eff}} = \frac{dTq}{d\varphi} = K_r\tan^2(\theta)(2r - r_o)r + K_r(r_o - r)r\frac{1}{\cos^2\theta}\frac{d\theta}{d\varphi}.$$

Stated differently, $$\theta(\varphi) = \int \frac{K_{\it{eff}} - A(r, \theta)}{B(r, \theta)}d\varphi,$$

where $A(r, \theta) = K_r\tan^2(\theta)(2r - r_o)$ and $$B(r, \theta) = K_r(r_o - r)r\frac{1}{\cos^2\theta}.$$

The effective spring rate $K_{\it{eff}}$ is thus determined in part by the cam surface 42, and radial travel (compression of the spring 46) versus tangential travel (movement of cam surface 42 relative to the roller element 60) is controlled by the cam angle θ. The description above provides the effective spring rate $K_{\it{eff}}$ under some ideal conditions. Under actual operating conditions, considering the dynamics of the roller element 60 and the block 70, the effective spring rate $K_{\it{eff}}$ may change slightly due to the effect of inertia.

Figure 11:
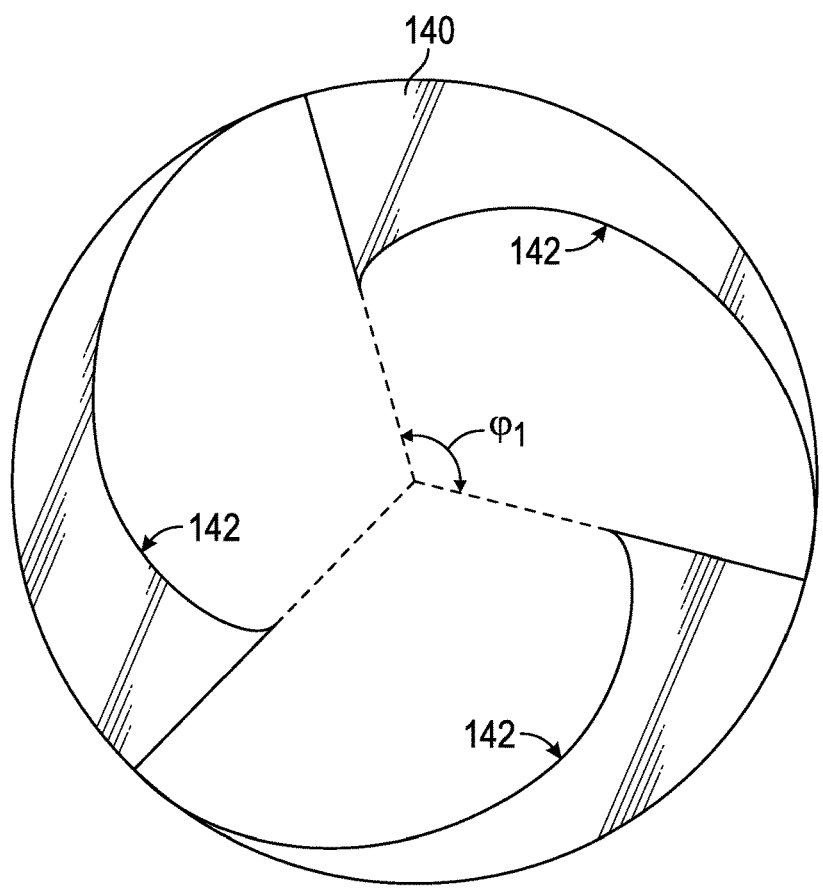
FIG. 11 is a schematic geometric diagram showing cam surfaces of the cam plate of the torque converter assembly of FIG. 9.
Figure 12:
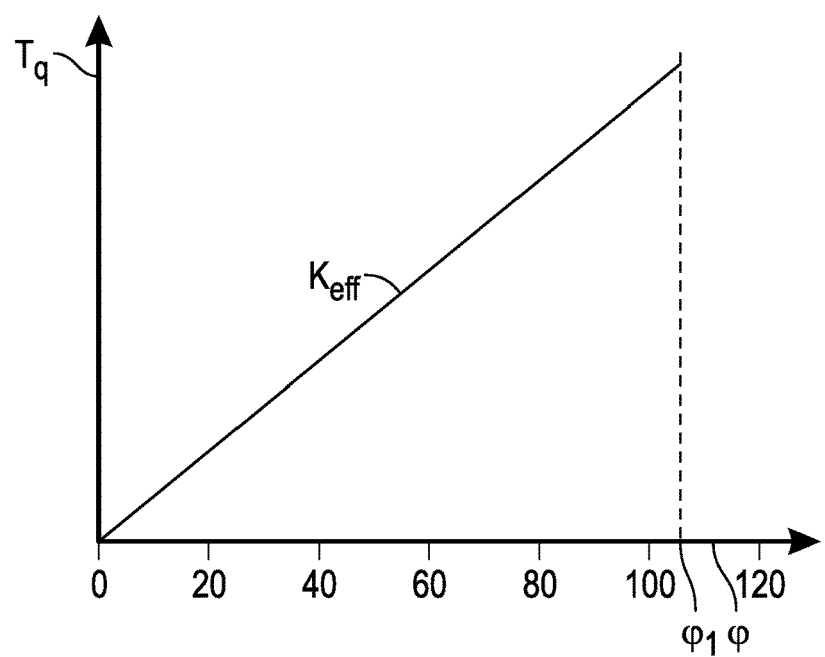
FIG. 12 is a plot of effective spring rate showing torque in Newton-meters (N-m) on the vertical axis and angular rotation on the horizontal axis for the springs of FIG. 9 when the cam surfaces of FIG. 11 are used.

FIG. 11 shows an example geometric arrangement of a cam plate 140 that can be used in place of cam plate 40 in FIG. 1. The cam plate 140 has three cam surfaces 142 each configured to extend over 106.22 degrees of angular rotation $\psi_1$ of the cam plate 140 relative to the springs 46 of FIG. 2. FIG. 12 is a plot of torque Tq transferred from the cam plate 140 to the transmission input member 20 through each spring 46 versus angular rotation of the cam plate 140 relative to the spring 46 when the cam surfaces 142 are used. FIG. 12 illustrates that the cam surfaces 142 are configured to provide an effective spring rate $K_{\it{eff}}$ that is linear over the predetermined range of angular rotation $\psi_1$ of the cam plate 140 relative to the spring 46. It should be appreciated that the schematic geometric depiction of the cam plate 140 shows only the cam surfaces 142 in detail. Although the cam surfaces 142 of FIG. 11 provide a linear effective spring rate $K_{\it{eff}}$, other cam surfaces may be used within the scope of the present teachings. For example, the cam surfaces may be configured to provide a completely non-linear effective spring rate $K_{\it{eff}}$ (i.e., an effective spring rate than changes constantly with angular rotation). Additionally, although the cam surfaces on a particular cam plate are shown as identical herein, the various cam surfaces on the same cam plate may have different profiles, providing different effective spring rates at the various profiles. For example, different cam surfaces may have a total effect that follows linear superposition.

Figure 13:
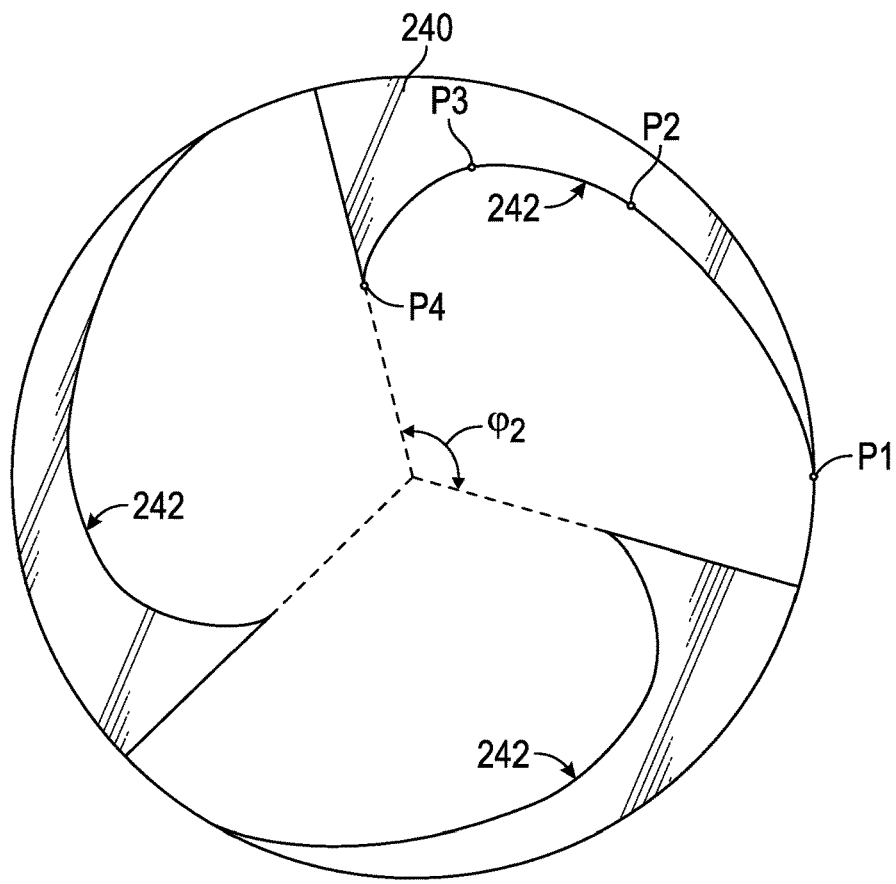
FIG. 13 is a schematic geometric diagram of alternative cam surfaces for the cam plate of the torque converter assembly of FIG. 2.
Figure 14:
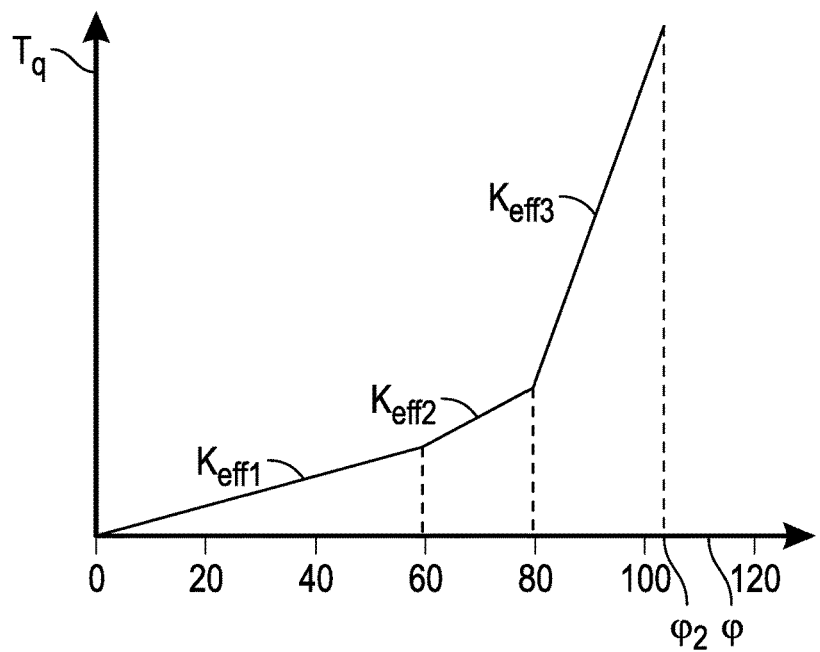
FIG. 14 is a plot of effective spring rates showing torque in Newton-meters (N-m) on the vertical axis and angular rotation on the horizontal axis for the springs of FIG. 9 when the cam surfaces of FIG. 13 are used.

FIG. 13 shows an example geometric arrangement of a cam plate 240 that can be used in place of cam plate 40 in FIG. 1. The cam plate 240 has three cam surfaces 242 each configured to extend over 104.16 degrees of angular rotation $\psi_2$ of the cam plate 240 relative to the springs 46 of FIG. 2. FIG. 14 is a plot of torque Tq transferred from the cam plate 240 to the transmission input member 20 through each spring 46 versus angular rotation of the cam plate 240 relative to the spring 46 when the cam surfaces 242 are used. FIG. 14 and illustrates that the cam surfaces 242 are configured to provide an effective spring rate that effectively has a first value $K_{\it{eff}1}$ over a first range of angular rotation (0 to 60 degrees) of the cam plate 240 relative to the spring 46 of FIG. 2, a second value $K_{\it{eff}2}$ over a second range of angular rotation (60 to 80 degrees) of the cam plate 240 relative to the spring 46 subsequent to the first range of angular rotation, and a third value over a third range of angular rotation (80 to 104.16 degrees) of the cam plate 240 relative to the spring 46 subsequent to the second range of angular rotation. It should be appreciated that the schematic geometric depiction of the cam plate 240 shows only the cam surfaces 242 in detail. It is evident in FIG. 13 that transitions between the effective spring rates $K_{\it{eff}1}$, $K_{\it{eff}2}$, $K_{\it{eff}3}$ correspond with changes in curvature of the cam surface 242. More specifically, from a contact point of the roller element 60 at P1 to P2 (0 to 60 degrees), the cam surface 242 has a first curvature; from contact point P2 to P3 (60 to 80 degrees), the cam surface 242 has a second curvature greater than the first curvature; and from contact point P3 to P4 (80 degrees to 104.16 degrees), the cam surface 242 has a third curvature greater than the second curvature.

Figure 15:
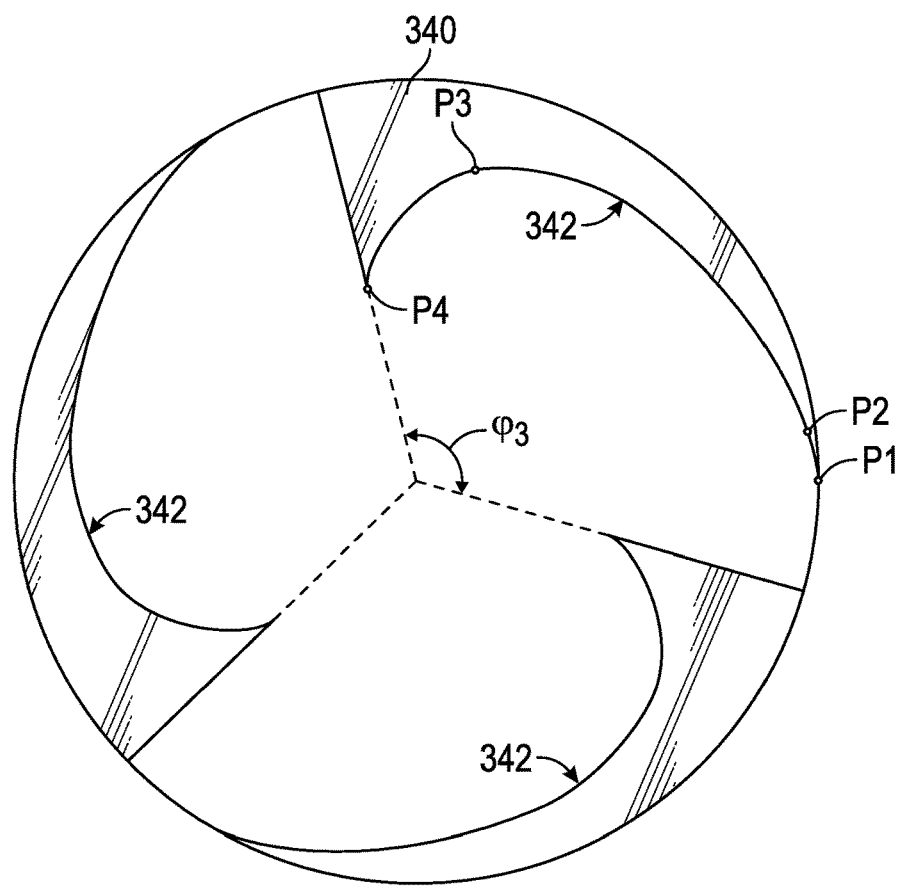
FIG. 15 is a schematic geometric diagram of alternative cam surfaces for the cam plate of the torque converter assembly of FIG. 2.
Figure 16:
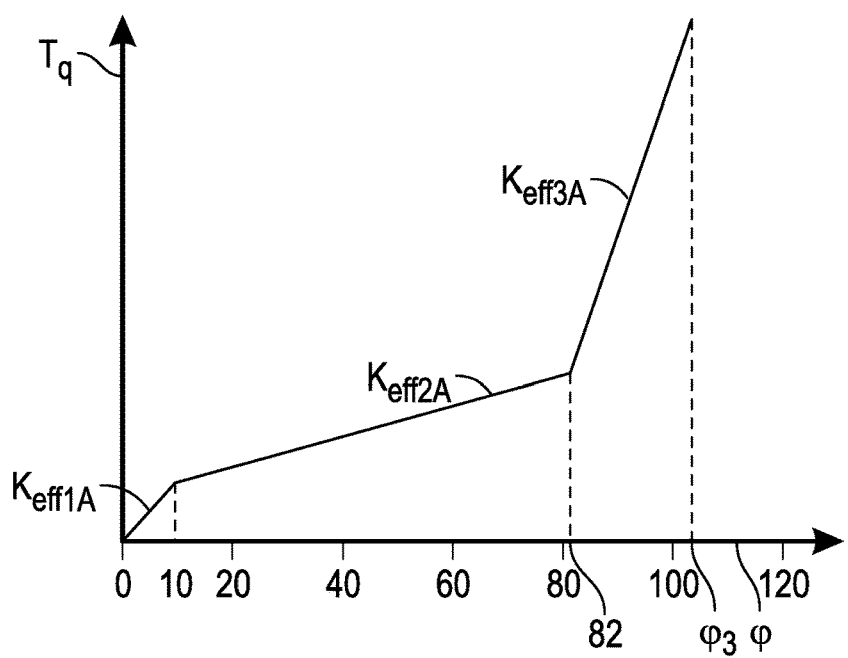
FIG. 16 is a plot of effective spring rated showing torque in Newton-meters (N-m) on the vertical axis and angular rotation on the horizontal axis for the springs of FIG. 9 when the cam surfaces of FIG. 15 are used.

FIG. 15 shows an example geometric arrangement of a cam plate 340 that can be used in place of cam plate 40 in FIG. 1. The cam plate 340 has three cam surfaces 342 each configured to extend over 103.6 degrees of angular rotation $\psi_3$ of the cam plate 340 relative to the springs 46 of FIG. 2. FIG. 16 is a plot of torque Tq transferred from the cam plate 340 to the transmission input member 20 through each spring 46 versus angular rotation of the cam plate 340 relative to the spring 46 when the cam surfaces 342 are used, and illustrates that the cam surfaces 342 are configured to provide an effective spring rate that effectively has a first value $K_{\it{eff}1A}$ over a first range of angular rotation (0 to 10 degrees) of the cam plate 340 relative to the spring 46 of FIG. 2, a second value $K_{\it{eff}2A}$ over a second range of angular rotation (10 to 82 degrees) of the cam plate 340 relative to the spring 46 subsequent to the first range of angular rotation, and a third value $K_{\it{eff}3A}$ over a third range of angular rotation (82 to 103.6 degrees) of the cam plate 340 relative to the spring 46 subsequent to the second range of angular rotation. It should be appreciated that the schematic geometric depiction of the cam plate 340 shows only the cam surfaces 342 in detail. The second value $K_{eff2A}$ is less than both the first value $K_{eff1A}$ and the third value $K_{eff3A}$. Accordingly, the cam plate 340 enables the springs 46 to provide a better vibration isolation capability for the range of input torque during the second range of angular rotation than during the first range of angular rotation. It is evident in FIG. 16 that transitions between the effective spring rates $K_{eff1A}$, $K_{eff2A}$, $K_{eff3A}$ correspond with changes in curvature of the cam surface 342. More specifically, from a contact point of the roller element 60 at P1 to P2 (0 to 10 degrees), the cam surface 342 has a first curvature; from contact point P2 to P3 (10 to 82 degrees), the cam surface 342 has a second curvature; and from contact point P3 to P4 (82 degrees to 103.6 degrees), the cam surface 342 has a third curvature greater than the second curvature.

Figure 17:
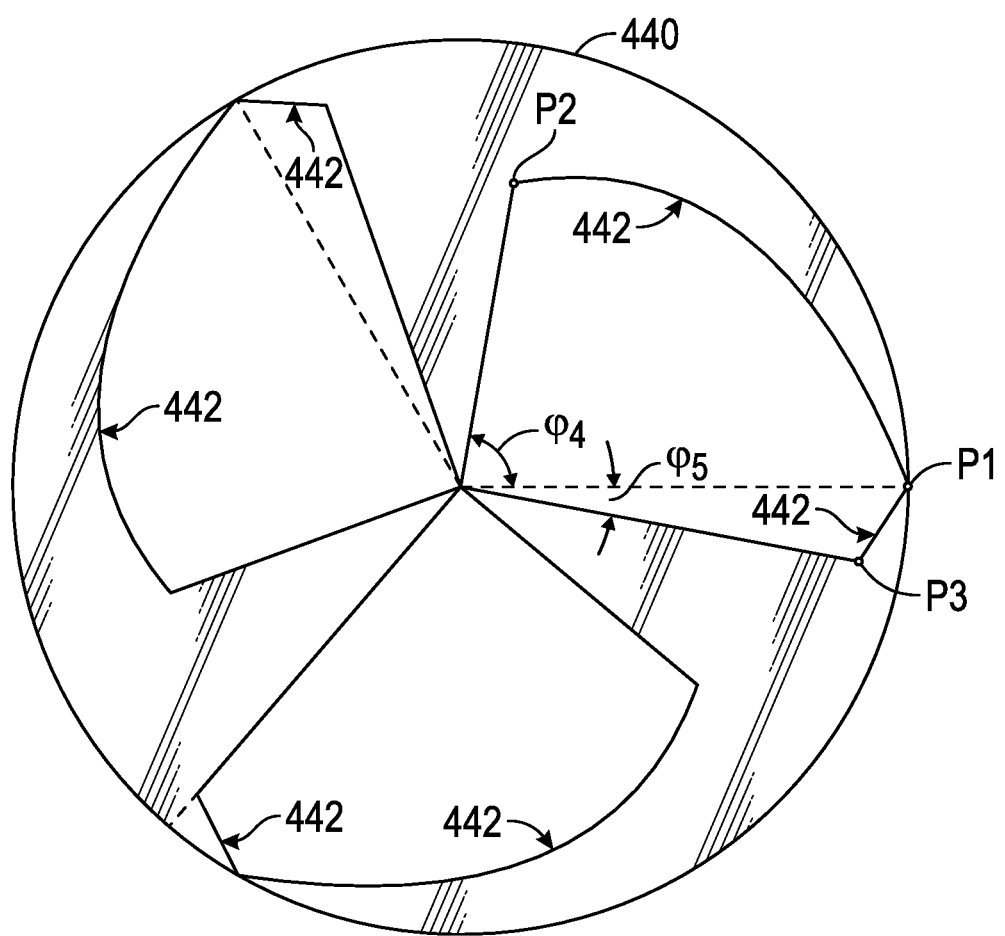
FIG. 17 is a schematic geometric diagram of alternative cam surfaces for the cam plate of the torque converter assembly of FIG. 2.

FIG. 17 shows an example geometric arrangement of a cam plate 440 that can be used in place of cam plate 40 in FIG. 1. A portion of the cam surfaces 442 extending over a predetermined range of angular rotation $\psi_4$ of the cam plate 440 relative to the spring 46 in FIG. 17 is similar to the cam profile of FIG. 12, with cam surfaces 142 configured to provide an effective spring rate $K_{eff}$ dependent on the cam profile between points P1 and P2 over the predetermined range of angular rotation $\psi_1$ of the cam plate 140 relative to the spring 46. The cam surfaces 442 also provide a portion extending over a predetermined range of angular rotation $\psi_5$ of the cam plate 440 in an opposite direction that is configured to provide an effective spring rate $K_{eff}$ dependent on the cam profile between points P1 and P3. For example, if negative torque is experienced, the cam surface 442 can provide the effective spring rate $K_{eff}$ over the predetermined range of angular rotation $\psi_5$. It should be appreciated that the schematic geometric depiction of the cam plate 440 shows only the cam surfaces 442 in detail.

The cam plates 40, 140, 240, 340, and 440 show only some of the various embodiments of cam surfaces that can be provided. By selecting the cam surfaces with selected curvatures that may be constantly changing with angular rotation or may extend over selected ranges of angular rotation and selecting the actual spring rate ($K_r$), the effective spring rate $K_{eff}$ is thus made fully "flexible". In other words, any desired effective spring rate $K_{eff}$ can be provided at any angular rotation and/or over any given range of angular rotation of the cam plate 40, 140, 240, or 340, with different effective spring rates at different angular rotations or over different ranges of angular rotation, and accordingly, different magnitudes of torsional torque transfer and torsional vibration absorption by the springs 46.

While various embodiments and modes for carrying out the many aspects of the present teachings have been described in detail, those familiar with the art to which these teachings relate will recognize various alternative aspects for practicing the present teachings that are within the scope of the appended claims. As such, the present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A vibration absorbing system for transmitting torque between a rotating output member of a power source and a rotatable input member of a load, the system comprising:
   a cam plate configured to attach to and rotate with one of the output member of the power source or the input member of the load, the cam plate having an inner periphery with a plurality of circumferentially spaced cam surfaces separated from each other by a plurality of shoulders, each of the cam surfaces having a curved segment, and each of the shoulders having a rectilinear wall aligned on a radial plane from a central rotational axis of the cam plate and adjoining a respective one of the cam surfaces; and
   a plurality of springs configured to attach to and rotate about an axis of rotation with the other one of the output member or the input member, each of the springs extending radially relative to the axis of rotation into operative engagement with the curved segment of a respective one of the cam surfaces such that the spring is compressed by the cam surface during relative rotation between the input and output members whereby the springs cooperatively absorb torsional vibrations of the power source,
   wherein each of the springs is configured to engage a respective one of the rectilinear walls when rotating in a first direction whereby the shoulders restrict rotation of the springs relative to the cam plate.

2. The system of claim 1, wherein each of the shoulders further includes a curved wall adjoined at one end thereof with the rectilinear wall and at another end thereof with the curved segment of another one of the cam surfaces, each of the springs being configured to engage a respective one of the curved walls when rotating in a second direction, opposite the first direction, whereby the shoulders further restrict rotation of the springs relative to the cam plate.

3. The system of claim 1, wherein the plurality of shoulders includes first, second and third shoulders with first, second and third rectilinear walls, respectively, the first, second and third rectilinear walls being spaced at least 100 degrees apart from one another.

4. The system of claim 3, wherein the plurality of cam surfaces includes a first cam surface interposed between the first and second shoulders, a second cam surface interposed between the second and third shoulders, and a third cam surface interposed between the third and first shoulders.

5. The system of claim 1, wherein the cam surfaces are shaped such that an effective spring rate of the springs is linear over a predetermined range of angular rotation of the cam plate relative to the springs.

6. The system of claim 1, wherein the cam surfaces are shaped such that an effective spring rate of the springs has:
   a first value over a first range of angular rotation of the cam plate relative to the springs,
   a second value over a second range of angular rotation of the cam plate relative to the springs subsequent to the first range of angular rotation, and
   a third value over a third range of angular rotation of the cam plate relative to the springs subsequent to the second range of angular rotation.

7. The system of claim 1, wherein the cam surfaces are shaped such that an effective spring rate of the springs is non-linear over a predetermined range of angular rotation of the cam plate relative to the springs.

8. The system of claim 1, further comprising a plurality of roller elements each operatively connected to a respective one of the springs and configured to roll against a respective one of the cam surfaces during rotation of the springs relative to the cam plate.

9. The system of claim 8, further comprising:
   a plurality of spring housings configured to attach to the other one of the input member or the output member to rotate in unison therewith, each of the spring housings forming a cavity seating therein a respective one of the springs; and a plurality of blocks each disposed between a respective one of the roller elements and a respective one of the springs.

10. The system of claim 1, wherein the cam surfaces are substantially identical, the shoulders are substantially identical, and the springs are substantially identical.

11. The system of claim 1, further comprising:

a rotatable driving member configured to be driven by the output member of the power source to rotate in unison therewith; and a rotatable driven member configured to be driven by the driving member via a fluid coupling to transmit torque to the input member of the load, wherein the cam plate is attached to one of the driving member or the driven member to rotate in unison therewith, and the springs are attached to the other one of the driving member or the driven member to rotate in unison therewith.

12. The system of claim 11, further comprising a clutch mechanism selectively engageable to lock the driving member to the driven member via the cam plate and the springs to thereby provide a torque path from the output member of the power source to the input member of the load that bypasses the fluid coupling.

13. The system of claim 12, further comprising a cover portion configured to rotate with the driven member, wherein the clutch mechanism includes a friction plate splined to the cam plate and an apply plate that moves axially to engage the friction plate with the cover portion.

14. A vibration absorbing system for transmitting torque between a rotating output member of a power source and a rotatable input member of a load, the system comprising:

a cam plate configured to attach to and rotate with one of the output member of the power source or the input member of the load, the cam plate having an inner periphery with a plurality of circumferentially spaced cam surfaces separated by a plurality of shoulders, each of the shoulders having a rectilinear wall adjoining a respective one of the cam surfaces; and a plurality of springs configured to rotate about an axis of rotation with the other one of the output member or the input member, each of the springs extending radially relative to the axis of rotation into operative engagement with a respective one of the cam surfaces such that the spring is compressed by the cam surface during relative rotation between the input and output members whereby the springs cooperatively absorb torsional vibrations of the power source; and a spring hub configured to attach to the other one of the input member or the output member to rotate in unison therewith, the spring hub including a plurality of spring cages projecting radially outward therefrom and each housing therein a respective one of the springs, wherein each of the spring cages is configured to abut a respective one of the shoulders and thereby restrict rotation of the springs relative to the cam plate in the first direction, and abut another respective one of the shoulders and thereby restrict rotation of the springs relative to the cam plate in a second direction opposite the first direction.

15. A torque converter assembly for transmitting torque from a crankshaft of an engine to an input shaft of a transmission, the torque converter assembly comprising:

a pump portion configured to be driven by the crankshaft of the engine to rotate about an axis of rotation;

a turbine portion configured to drive the input shaft of the transmission and be driven by the pump portion via a fluid coupling to rotate about the axis of rotation and transmit torque from the engine to the transmission;

a cam plate operatively connected to the pump portion to rotate in unison therewith, the cam plate having an inner periphery with a plurality of circumferentially spaced cam surfaces separated from each other by a plurality of shoulders, each of the cam surfaces having a curved segment, and each of the shoulders having a rectilinear wall aligned on a radial plane from a central rotational axis of the cam plate and adjoining a respective one of the cam surfaces; and a plurality of springs connected to the turbine portion to rotate in unison therewith about the axis of rotation, each of the springs extending radially relative to the axis of rotation into operative engagement with the curved segment of a respective one of the cam surfaces such that the spring is compressed by the cam surface during relative rotation between the crankshaft and input shaft whereby the springs cooperatively absorb torsional vibrations generated by the engine, wherein each of the springs is configured to engage a respective one of the rectilinear walls when rotating in a first direction whereby the shoulders restrict rotation of the springs relative to the cam plate.

16. The torque converter assembly of claim 15, wherein each of the shoulders further includes a curved wall adjoined at one end thereof with the rectilinear wall and at another end thereof with the curved segment of another one of the cam surfaces, and wherein each of the springs is configured to engage a respective one of the curved walls when rotating in a second direction, opposite the first direction, whereby the shoulders further restrict rotation of the springs relative to the cam plate.

17. The torque converter assembly of claim 15, wherein the plurality of shoulders includes first, second and third shoulders with first, second and third rectilinear walls, respectively, the first, second and third rectilinear walls being spaced at least 100 degrees apart from one another.

18. The torque converter assembly of claim 15, wherein the cam surfaces are shaped such that an effective spring rate of the springs is linear over a predetermined range of angular rotation of the cam plate relative to the springs.

* * * * *